US012619134B2

(12) United States Patent
Schuster et al.

(10) Patent No.: US 12,619,134 B2
(45) Date of Patent: May 5, 2026

(54) FASTENING DEVICE FOR AN ENVIRONMENTAL SENSOR, AND SENSOR INSTALLATION SYSTEM FOR A VEHICLE

(71) Applicant: Bayerische Motoren Werke Aktiengesellschaft, Munich (DE)

(72) Inventors: Benjamin Schuster, Munich (DE); Maximilian Mayr, Woerth (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 142 days.

(21) Appl. No.: 18/686,264

(22) PCT Filed: Jul. 27, 2022

(86) PCT No.: PCT/EP2022/071043
§ 371 (c)(1),
(2) Date: Feb. 23, 2024

(87) PCT Pub. No.: WO2023/025499
PCT Pub. Date: Mar. 2, 2023

(65) Prior Publication Data
US 2024/0353743 A1 Oct. 24, 2024

(30) Foreign Application Priority Data
Aug. 25, 2021 (EP) .................................... 21193020

(51) Int. Cl.
*G03B 17/56* (2021.01)
*B60R 11/04* (2006.01)
(52) U.S. Cl.
CPC ............ *G03B 17/561* (2013.01); *B60R 11/04* (2013.01)

(58) Field of Classification Search
None
See application file for complete search history.

(56) References Cited

U.S. PATENT DOCUMENTS

2013/0334268 A1* 12/2013 Huttenlocher .......... B60R 11/04
224/567

FOREIGN PATENT DOCUMENTS

DE 102006061308 A1 * 6/2008 ............. B60R 11/00
DE 102009011614 A1 * 9/2010 ............. B60R 11/02
(Continued)

OTHER PUBLICATIONS

International Search Report (PCT/ISA/210) issued in PCT Application No. PCT/EP2022/071043 dated Oct. 18, 2022 (2 pages).
(Continued)

*Primary Examiner* — Rodney E Fuller
(74) *Attorney, Agent, or Firm* — Crowell & Moring LLP

(57) ABSTRACT

A fastening apparatus for a surround sensor of a vehicle includes a sensor holding device having a receptacle region in which at least regions of the surround sensor are arrangeable when the surround sensor is fastened to the sensor holding device and a holding spring device which is configured to hold the surround sensor via a spring force for fastening the surround sensor in the receptacle region. A bearing element is disposed at a first end of the holding spring device and the holding spring device is rotatably mounted on the sensor holding device by the bearing element. The holding spring device is releasably fixable to the sensor holding device at a second end of the holding spring device which is opposite to the first end of the holding spring device.

8 Claims, 6 Drawing Sheets

(56)     References Cited

FOREIGN PATENT DOCUMENTS

| | | | |
|---|---|---|---|
| DE | 10 2012 011 596 B3 | 7/2013 | |
| DE | 10 2013 200 966 A1 | 8/2013 | |
| DE | 102020100809 A1 * | 7/2021 | ............ B60R 13/04 |
| EP | 3 173 289 A1 | 5/2017 | |
| EP | 3 173 290 A1 | 5/2017 | |
| WO | WO 01/05636 A1 | 1/2001 | |
| WO | WO 2008/068573 A2 | 6/2008 | |

OTHER PUBLICATIONS

German-language European Search Report issued in European Application No. 21193020.1-1132 dated Jan. 20, 2022, with Statement of Relevancy (7 pages).

* cited by examiner

FASTENING DEVICE FOR AN ENVIRONMENTAL SENSOR, AND SENSOR INSTALLATION SYSTEM FOR A VEHICLE

BACKGROUND AND SUMMARY

The present invention relates to a fastening apparatus for a surround sensor of a vehicle. Moreover, the present invention relates to a sensor installation system for a vehicle.

The steady rise of driver assistance systems in the vehicle requires a comprehensive surround sensor system. For example, these include, inter alia, cameras and radar, lidar, and ultrasound sensors. To ensure a correct functionality of the driver assistance systems, the surround of the vehicle has to be registered as exactly as possible. In this context, it is particularly important that the corresponding surround sensors are installed and aligned as intended. The assembly of surround sensors requires a simple manner of installation, as little error prone as possible, within the scope of a mass production.

Document DE 10 2013 200 966 A1 relates to a module apparatus for a camera system having a housing device which has an inner opening and which is designed to allow an installation position of the module apparatus within a motor vehicle to be adjusted. The module apparatus comprises a sensor holding device which has an upper region and a base region and which is coupled to the housing device by way of at least one support element and which is designed to accommodate an image sensor. Moreover, such a module apparatus comprises a lens device which is coupled by the sensor holding device to the upper region by way of at least one connection element and which is designed to create an optical image on the image sensor, and having a holding spring device which is coupled to the base region of the sensor holding device and which is designed to press the image sensor with the heat-conducting intermediate layer against the sensor holding device by means of spring force, and in the process form a heat conduction path via the heat-conducting intermediate layer.

It is an object of the present invention to create a fastening apparatus and a sensor installation system for a surround sensor of a vehicle, which ensures a fast, low-tolerance, and correct assembly of the surround sensor and which allows the assembled surround sensor to be released quickly and easily from the fastening apparatus during maintenance work.

A fastening apparatus according to the invention for a surround sensor of a vehicle comprises a sensor holding device having a receptacle region, in which at least regions of the surround sensor are arrangeable when the surround sensor is fastened to the sensor holding device as intended. Moreover, the fastening apparatus comprises a holding spring device which is configured to hold the surround sensor by way of a spring force, for the purpose of fastening the surround sensor in the receptacle region as intended. In this case, at a first end the holding spring device comprises a bearing element by means of which the holding spring device is rotatably mounted on the sensor holding device. Finally, at a second end opposite to the first end the holding spring device is releasably fixable to the sensor holding device, for the purpose of fastening as intended.

In other words, at least regions of the surround sensor of the vehicle can be arranged within the receptacle region of the sensor holding device. Here, at least regions of the surround sensor being arranged is understood to mean an arrangement of the surround sensor in the receptacle region of the sensor holding device, in the case of which at least regions of the surround sensor are encompassed, which is to say at least regions of the surround sensor are surrounded by the receptacle region. Should the surround sensor be fastened to the sensor holding device as intended, or have at least regions thereof arranged in the receptacle region, the holding spring device can be used to hold the surround sensor in the receptacle region by means of the spring force.

The bearing element of the holding spring device located at the first end of the holding spring device is rotatably mounted on the sensor holding device. Thus the surround sensor can be assembled particularly easily since the spring force for holding the surround sensor in the receptacle region can be applied by one hand on account of the rotary movement. At the second end the holding spring device can be releasably fixed to the sensor holding device for fastening as intended. An intermediate region of the holding spring device which is located between the first end and the second end of the holding spring device opposite to the first end exerts a spring force on a surround sensor arranged as intended in the receptacle region and holds the surround sensor in the sensor holding device or in the receptacle region of the sensor holding device. As a result, it is moreover possible to easily exert a significant spring force within the scope of assembly on account of the arising lever. The lever or the lever force arises by virtue of the holding spring device being rotatably mounted at the first end and a force being applied during the assembly at the second end opposite to the first end. In this case, the holding spring device can be designed for example as a leaf spring, torsion spring, or the like.

An advantageous embodiment of the fastening apparatus provides for the sensor holding device to comprise a pivot element, at least regions of which are surrounded by the bearing element. In this case, the pivot element of the sensor holding device serves for the rotatable mount of the holding spring device. Since the bearing element of the holding spring device only surrounds regions of the pivot element, a simple assembly of the holding spring device on the sensor holding device is possible. In other words, the holding spring device with the bearing element situated at the first end can be assembled on the sensor holding device—for example by means of a plug-in fit or by means of a latching connection. Consequently, this allows the holding spring device to be assembled in particularly simple fashion. Finally, the holding spring device consequently is rotatably mounted on the sensor holding device. Further, a lever action, which simplifies the assembly and increases the stability of the surround sensor fastened to the sensor holding device as intended, thus can be exerted via the bearing element and the intermediate region of the holding spring device, which exerts the spring force on the surround sensor fastened as intended.

Moreover, it is advantageous if the holding spring device and the sensor holding device comprise corresponding latching elements which form a latching connection for the purpose of releasably fixing the holding spring device to the sensor holding device. For example, the sensor holding device can have a notch or a cutout as latching element. For example, the holding spring device can have an elevation or a protrusion as latching element. In this case, the notch or the cutout can form one of the corresponding latching elements together with the elevation or the protrusion, wherein the elevation or the protrusion for releasably fixing the holding spring device engages in the notch or the cutout in the sensor holding device. Within the scope of assembling the surround sensor in the fastening apparatus, it is consequently easily possible to apply the spring force for holding the surround sensor in the receptacle region of the sensor holding device and fix the holding spring device to the sensor holding device by means of the latching connection.

A further advantageous embodiment of the fastening apparatus provides for the corresponding latching elements to be designed such that these only form the latching connection if the spring force exceeds a predetermined minimum force. A situation often arising during the assembly of the surround sensor is that the surround sensor is correctly arranged in the receptacle region of the sensor holding device but the assembling member of staff exerts too little force on the holding spring device. What may happen as a consequence is that corresponding latching elements do not form a latching connection and the holding spring device therefore by means of the spring force cannot hold the surround sensor in the receptacle region for fastening as intended. However, since the corresponding latching elements do not form a latching connection, an incorrect assembly can be identified immediately by the member of staff. In other words, this can implement an alternative and/or an additional quality control in the form of an IO inspection. A correct assembly can consequently also be ensured within the scope of mass production.

Moreover, a situation that may also arise within the scope of assembling the surround sensor is that of the surround sensor not being correctly arranged in the receptacle region of the sensor holding device for fastening as intended. As a consequence, an increased spring force may be required for fixing the holding spring device to the sensor holding device. Consequently, an increased force can be exerted on the latching connection on account of the increased spring force. If the spring force or the increased force exerted on the latching connection exceeds a predetermined tolerance range, then the latching connection may also release under certain circumstances. As a result, an additional or an alternative faulty assembly of the surround sensor in the fastening apparatus can be avoided.

Furthermore, it is advantageous if the sensor holding device and/or the holding spring device comprises an auxiliary element which is configured to release the latching connection. It is particularly advantageous within the scope of service work, or in order to remove or disassemble the surround sensor, if the latching connection can be released easily and in uncomplicated fashion. For example, if the corresponding latching elements—as described above in exemplary fashion—are a notch or a cutout in the sensor holding device and an elevation or a protrusion on the holding spring device, then it is possible, for example, to attach an auxiliary element in the form of a lever at the holding spring device or at the elevation or the protrusion of the holding spring device, the lever being configured to release the elevation or the protrusion from the notch or the cutout. If the elevation or the protrusion on the holding spring device can be released from the notch or the cutout in the sensor holding device, then the latching connection can be released easily and in uncomplicated fashion. Naturally, further structures serving to release the latching connection are also conceivable—depending on the type of latching connection.

Finally, it is advantageous if for fastening the surround sensor to the sensor holding device as intended, the rotatably mounted holding spring device has a minimum rotary range of between 70° and 200°, preferably between 80° and 180°. By means of such a minimum rotary range it is possible to ensure that, within the scope of an assembly, the surround sensor is particularly easily arrangeable in the receptacle region of the sensor holding device. What needs to be given due consideration here is that such a minimum rotary range places certain demands on the bearing element of the holding spring device and on a possible pivot element of the sensor holding device, at least regions of which pivot element are surrounded by the bearing element. For example, a simply clipped or plugged-on holding spring device cannot ensure such a minimum rotary range. A given minimum rotary range can be realized by means of the bearing element of the holding spring device, an optional pivot element, and a geometric design of the holding spring device and the sensor holding device. As a result, the surround sensor can be arranged in the receptacle region of the sensor holding device and can be fastened as intended by means of very easily executable movements. Consequently, this in particular simplifies the assembly of the surround sensor.

A sensor installation system according to the invention for a vehicle comprises a fastening apparatus according to the invention and a surround sensor which is arranged in the receptacle region.

An advantageous embodiment of the sensor installation system provides for the sensor holding device of the fastening apparatus and the surround sensor to comprise corresponding alignment elements, which ensure the fastening as intended by means of a poka-yoke principle. The corresponding alignment elements can for example be designed in the form of alignment pins and alignment openings corresponding to the alignment pins. For example, the surround sensor or the housing of the surround sensor can thus comprise alignment pins. If the surround sensor is arranged in, or fastened as intended to, the receptacle region of the sensor holding device of the fastening apparatus, then the alignment pins can fit in the alignment openings which have been formed in the sensor holding device. The arrangement of the exemplary alignment elements in the form of alignment pins and alignment openings is likewise also conceivable vice versa. Thus, for example, it is also conceivable for the alignment pins to be arranged on the sensor holding device and the alignment openings to be arranged in the surround sensor or the housing of the surround sensor.

In this case, the corresponding alignment elements are always arranged on the fastening apparatus or the surround sensor such that it is possible to ensure that the surround sensor is fastened as intended and the surround sensor is consequently also exactly aligned. Further, this can ensure an exact registration of the surroundings of the vehicle. The corresponding alignment elements can consequently form a technical measure or device for preventing errors during the assembly of the surround sensor. Such a principle is also referred to as poka-yoke principle or key-lock principle.

Moreover, it is advantageous if together with the holding spring device of the fastening apparatus, the corresponding alignment elements restrict a movement of the surround sensor relative to the sensor holding device in three mutually perpendicular spatial directions. For example, it is conceivable that a first alignment pin and a first alignment opening in the form of a round hole restrict the movement of the surround sensor relative to the sensor holding device in three mutually perpendicular spatial directions. A second alignment pin and a second alignment opening in the form of a slot can additionally restrict a movement of the surround sensor relative to the sensor holding device in two mutually perpendicular spatial directions. Using this, it is possible to additionally prevent a further one of the three possible rotations. Additional alignment elements, for example in the form of support faces and support points, are able to restrict a movement of the surround sensor relative to the sensor holding device in a further spatial direction. Consequently, it is ultimately possible to also prevent a rotation about the remaining axis. Together with the holding spring device, it is thus possible to restrict a movement of the surround sensor relative to the sensor holding device completely, which is to say both in translational and rotational fashion.

Overall, this can firstly ensure a fastening as intended and secondly allow an exact alignment of the surround sensor in the receptacle region of the fastening apparatus. Moreover, the corresponding alignment elements can ensure that the fastening apparatus can be produced easily and possible manufacturing tolerances, which may lead to an incorrect alignment of the surround sensor, can be compensated for. Depending on the embodiment of the corresponding alignment elements, it is further possible to ensure that the surround sensor is not arranged in statically overdetermined fashion. Moreover, it is possible to ensure an assembly or a fastening as intended of the surround sensor in the receptacle region, while observing given manufacturing tolerances. Moreover, use can be made of very different production methods and materials. For example, in such a fastening apparatus according to the invention, or in the advantageous embodiments thereof, use can also be made of plastics with an increased fiberglass component, for example 30% or more.

Finally, it is advantageous if as the surround sensor, a camera is arranged in the receptacle region. In other words, the surround sensor can be in the form of a camera. In particular, the camera can be in the form of what is known as a satellite camera. In this case, the designation "satellite camera" should be understood to mean a camera in which the controller connected to the camera is installed at a different position to the camera. However, provision can also be made for the surround sensor to be in the form of an optical sensor, infrared sensor, lidar sensor, or the like.

A further aspect of the invention relates to a vehicle comprising a sensor installation system according to the invention for a vehicle. In particular, the vehicle can be in the form of an automobile.

The preferred embodiments presented in relation to the fastening apparatus according to the invention, and the advantages thereof, apply accordingly to the sensor installation system according to the invention and to the vehicle according to the invention.

Further features of the invention arise from the claims, the figures, and the description of the figures. The features and feature combinations mentioned in the description above and the features and feature combinations mentioned below in the description of the figures and/or only shown in the figures can be used not only in the respectively specified combination but also in any other combination or on their own, without departing from the scope of the invention.

The invention will now be explained in detail on the basis of preferred exemplary embodiments and with reference to the attached drawings.

DETAILED DESCRIPTION OF THE DRAWINGS

In the figures, the same or functionally equivalent elements are denoted by the same reference signs.

Figure 1:
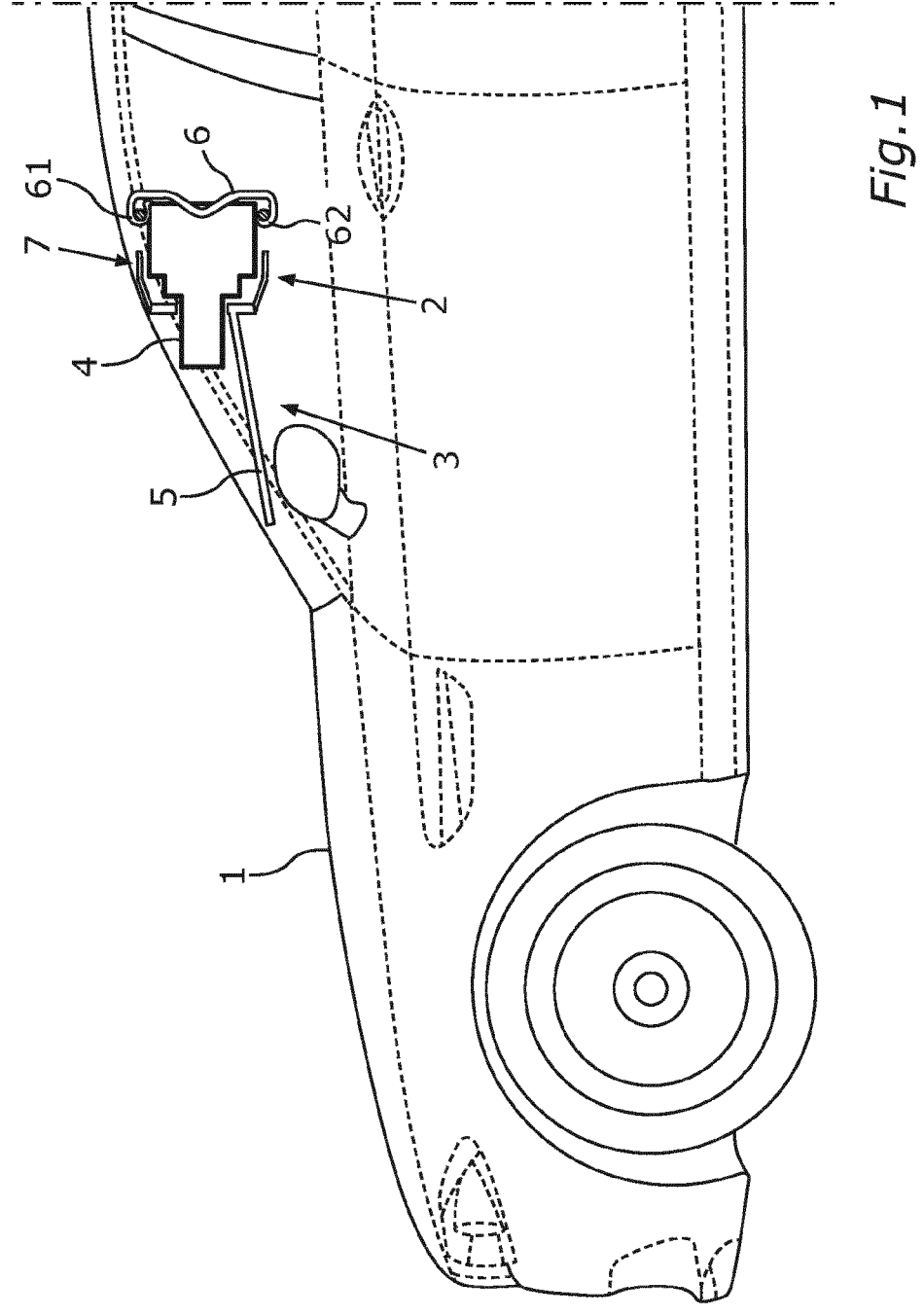
FIG. 1 shows a schematic illustration of a vehicle comprising a sensor installation system.

FIG. 1 shows a schematic illustration of a front region of a vehicle 1 which comprises a sensor installation system 2 according to the invention. In this case, the sensor installation system 2 is arranged behind the windshield of the vehicle 1. The sensor installation system 2 comprises a fastening apparatus 3 according to the invention and a surround sensor 4. The surround sensor 4 is in the form of a camera in the present example. However, it is also conceivable for the surround sensor 4 to be a lidar, radar, or infrared sensor or the like.

The fastening apparatus 3 comprises a sensor holding device 5 and a holding spring device 6. The holding spring device 6 is in the form of a leaf spring in the present example. However, it is also conceivable for the holding spring device 6 to be in the form of a bent wire part, torsion spring, or the like. The sensor holding device 5 has a receptacle region 7. At least regions of the surround sensor 4 can be arranged within the receptacle region 7 in the case where the surround sensor is fastened to the sensor holding device 5 as intended. The holding spring device 6 is configured to hold the surround sensor 4 by way of a spring force, for fastening the surround sensor in the receptacle region 7 as intended. Moreover, a part of the sensor holding device 5 can be in the form of a stray light stop.

At a first end the holding spring device 6 comprises a bearing element 61. The holding spring device 6 is rotatably mounted on the sensor holding device 5 by means of the bearing element 61. At a second end opposite to the first end of the holding spring device 6 the holding spring device 6 comprises a latching element 62. The latching element 62 serves to releasably fix the holding spring device 6 to the sensor holding device 5. To this end, the sensor holding device 5 comprises a corresponding latching element 62'.

Figure 2:
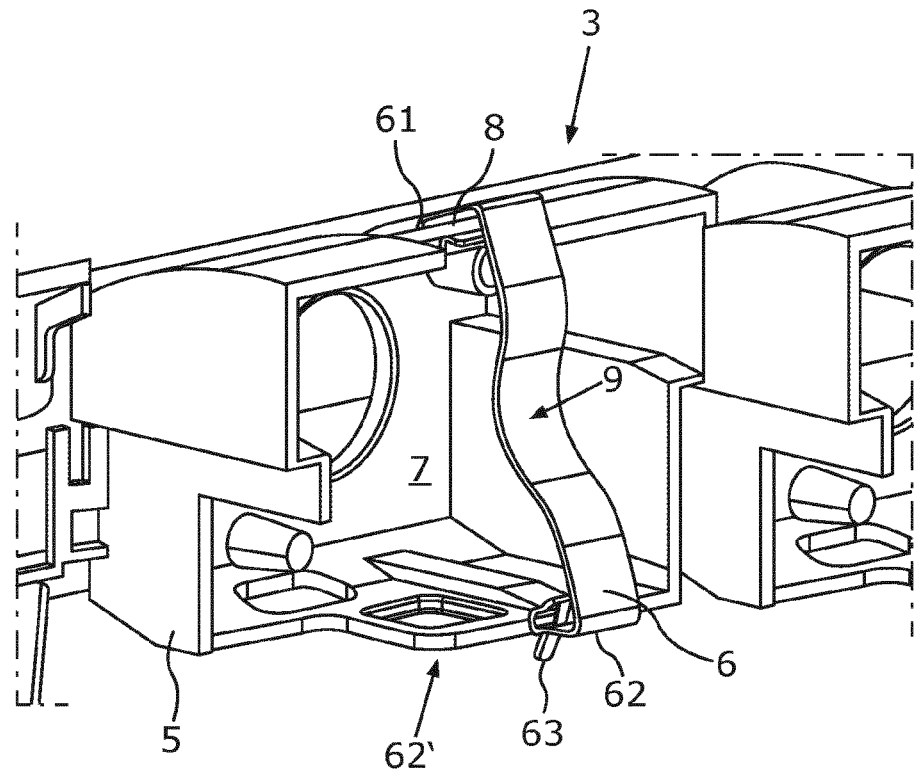
FIG. 2 shows a perspective view of a fastening apparatus for a surround sensor of a vehicle.

FIG. 2 shows a perspective view of the fastening apparatus 3 for a surround sensor 4 of a vehicle 1 in detail. In addition to the sensor holding device 5 and the holding spring device 6, FIG. 2 shows a pivot element 8 of the sensor holding device 5. In this case, at least regions of the pivot element 8 are surrounded by the bearing element 61. The holding spring device 6 with the bearing element 61 situated at the first end can thus be assembled on the sensor holding device 5—for example by means of a plug-in fit. Consequently, the holding spring device 6 can thus be assembled particularly easily. On account of such a rotatable mount of the holding spring device 6 on the sensor holding device 5, the holding spring device 6 can be pivoted, whereby the assembly of the surround sensor 4 can be simplified.

To releasably fix the holding spring device 6 to the sensor holding device 5 by means of the latching element 62 the sensor holding device 5 comprises a corresponding latching element 62' which is in the form of an opening. If the surround sensor 4 is located in the receptacle region 7 for fastening to the sensor holding device 5 as intended, then the surround sensor 4 can be held in the receptacle region 7 by means of the holding spring device 6 using a spring force. To releasably fix the holding spring device 6 to the sensor holding device 5, a latching connection can be formed by means of the latching element 62 and the corresponding latching element 62'.

An intermediate region 9 of the holding spring device 6 situated between the first end and the second end of the holding spring device 6 opposite to the first end can exert a spring force on a surround sensor 4 arranged in the receptacle region 7 as intended. As a result, the surround sensor 4 can be held in the sensor holding device 5 or in the receptacle region 7 of the sensor holding device 5. Moreover, a high spring force can easily be exerted on account of the arising lever.

Moreover, the holding spring device 6 may comprise an auxiliary element 63. In the present example, the auxiliary element 63 is arranged in the region of the latching element 62 of the holding spring device 6. The auxiliary element 63 is configured to manually release the latching connection which can be formed by means of the latching element 62 and the corresponding latching element 62'. Thus, a surround sensor 4 can be removed easily and in uncomplicated fashion within the scope of service work or the like.

Figure 3:
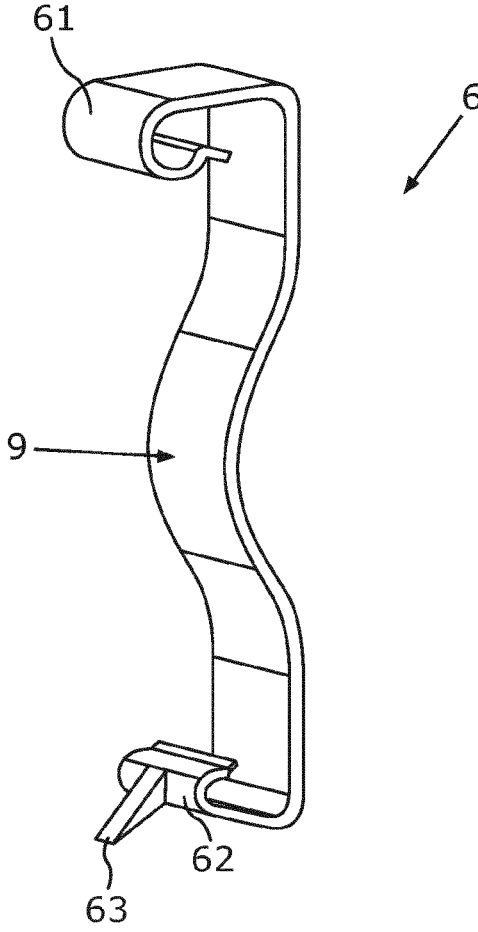
FIG. 3 shows a perspective view of a holding spring device of a fastening apparatus for a surround sensor of a vehicle.

FIG. 3 shows a design drawing of the holding spring device 6 of the fastening apparatus 3 for the surround sensor 4 of the vehicle 1, which can also be seen in the perspective view of FIG. 2. The holding spring device is in the form of a leaf spring in this example. Moreover, how the bearing element 61, which surrounds at least regions of the pivot element 8 of the sensor holding device 5, can be formed is depicted here. Moreover, the latching element 62, which can be arranged at the second end of the holding spring device 6 opposite to the first end, is shown in detail. Moreover, an auxiliary element 63 can be arranged in the region of the latching element 62. As illustrated in the design drawing, the auxiliary element 63 can release the latching connection by means of a lever action. The holding spring device 6 moreover has an intermediate region 9. In this case, the intermediate region 9 may serve for force transmission. In other words, the intermediate region 9 may rest against the surround sensor 4 and hold the surround sensor 4 by way of a spring force, for the purpose of fastening the surround sensor in the receptacle region 7 of the sensor holding device 5 as intended.

Figure 4:
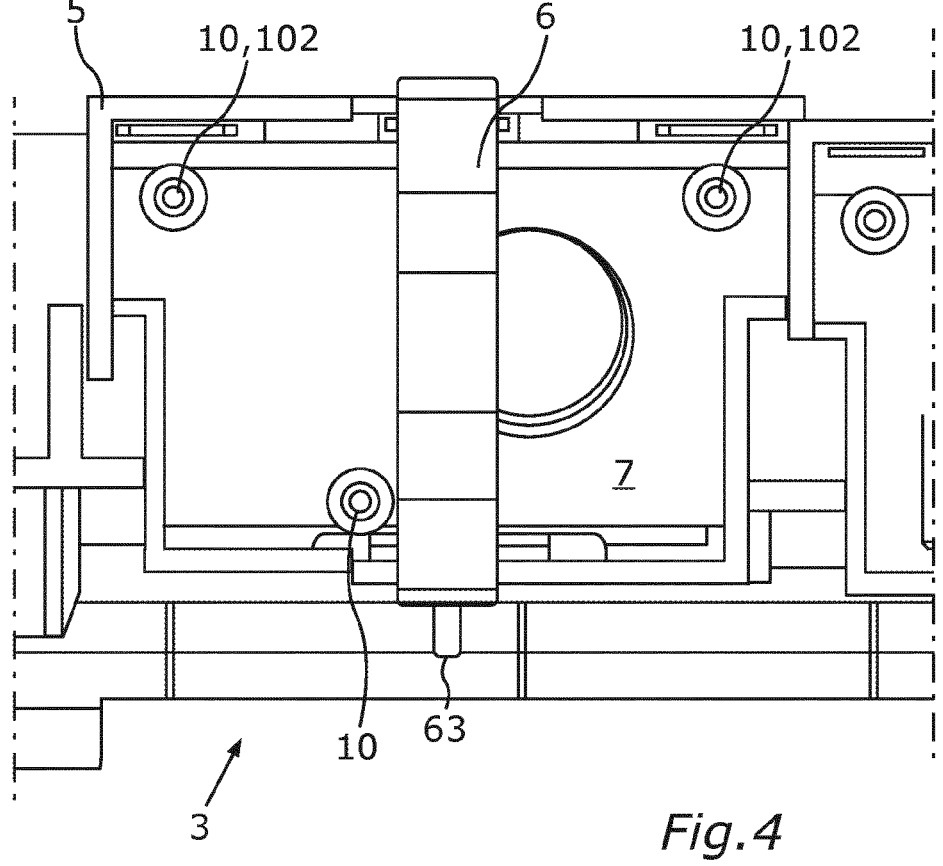
FIG. 4 shows a perspective view of a fastening apparatus for a surround sensor of a vehicle, which has corresponding alignment elements in the form of alignment openings.

FIG. 4 shows a perspective view of the fastening apparatus 3 for the surround sensor 4 of the vehicle 1 according to FIG. 2 from another perspective. The sensor holding device 5 of the fastening apparatus 3 and the surround sensor 4 may comprise corresponding alignment elements 10 which, by means of a poka-yoke principle, ensure the fastening as intended and the exact alignment of the surround sensor 4. In the present example, the sensor holding device 5 has alignment openings 102 within the receptacle region 7. These alignment openings 102 can be designed in the form of a round hole and a slot. This can ensure that the surround sensor 4, when fastened as intended in the receptacle region 7 of the sensor holding device 5, is not arranged in mechanically overdetermined fashion. Moreover, a fastening of the surround sensor 4 in the receptacle region 7 as intended can be ensured, while observing given manufacturing tolerances.

The alignment elements 10 can ensure that the surround sensor 4 is correctly arranged for fastening to the sensor holding device 5 as intended. To this end, the corresponding alignment elements 10, which may be attached to the surround sensor 4, can engage in the alignment elements 10 of the sensor holding device 5.

Provided the surround sensor 4 is arranged as intended in the receptacle region 7 of the sensor holding device 5, the holding spring device 6 can be releasably fixed to the sensor holding device 5. In the process, the holding spring device 6 exerts a spring force on the surround sensor 4, for the purpose of fastening as intended in the receptacle region 7. A situation that may arise during the assembly of the surround sensor 4 is that the surround sensor 4 is correctly arranged in the receptacle region 7 of the sensor holding device 5 but the assembling member of staff exerts too little force on the holding spring device 6. What may happen as a consequence is that the corresponding latching elements 10 do not form a latching connection and the holding spring device 6 therefore by means of the spring force cannot hold the surround sensor 4 in the receptacle region 7 for fastening as intended. However, since the corresponding latching elements 10 do not form a latching connection, an incorrect assembly can be identified immediately by the member of staff. Thus, an additional quality control can be implemented within the scope of the assembly.

An incorrect arrangement of the surround sensor 4 in the receptacle region 7 of the sensor holding device 5 may for example also occur if the corresponding alignment elements 10 of the sensor holding device 5 and surround sensor 4 do not correctly engage in one another on account of dirt, deposits, and/or the like. During an assembly of the surround sensor 4, this may lead to an increased spring force being required to fix the holding spring device 6 to the sensor holding device 5. As a consequence, an increased force may be exerted on the latching connection or on the corresponding latching elements 62, 62' in such a case. In order to avoid such incorrect assemblies, the corresponding latching elements 62, 62' can also be designed so that the latching connection releases if such a spring force or increased force exceeds a predetermined tolerance range.

Figure 5:
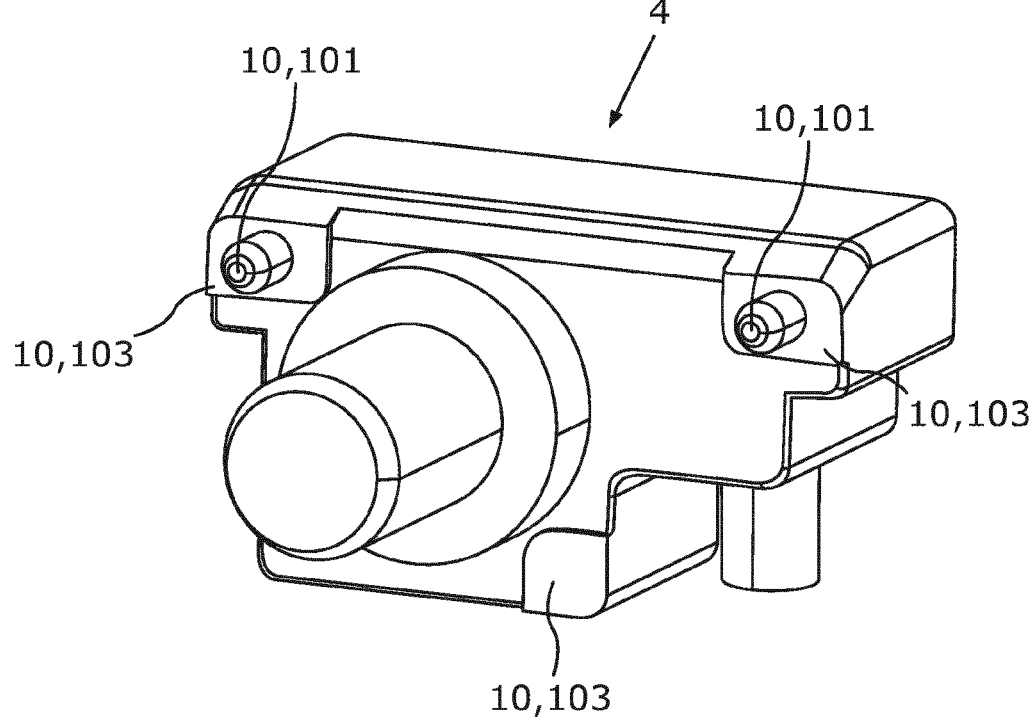
FIG. 5 shows a perspective view of a surround sensor in the form of a camera, which has corresponding alignment elements in the form of alignment pins.

FIG. 5 shows a perspective view of an exemplary surround sensor 4, at least regions of which are arrangeable in the receptacle region 7 of the sensor holding device 5 for the purpose of fastening the surround sensor to the sensor holding device 5 as intended. The surround sensor 4 is in the form of a camera in this example. The surround sensor 4 may comprise alignment elements 10. In this example, the alignment elements 10 are depicted in the form of two alignment pins 101 and in the form of three alignment stops 103. The alignment elements 10 of the surround sensor 4 can in this case engage in the corresponding alignment elements 10 of the sensor holding device 5, which may be embodied in the form of alignment openings 102 in this case.

Figure 6:
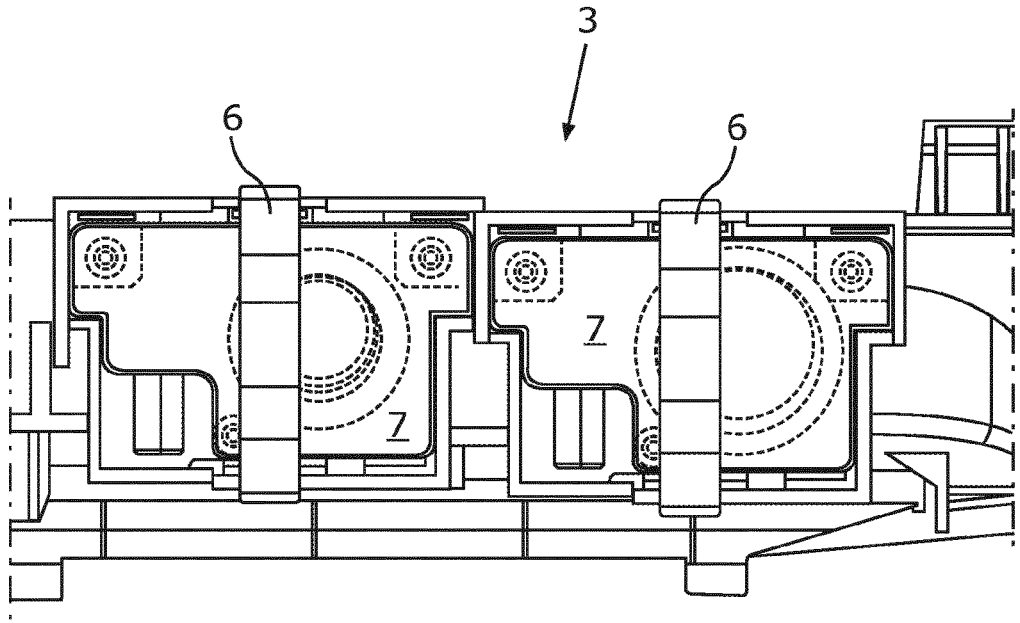
FIG. 6 shows a perspective view of a sensor installation system for a vehicle in a further embodiment, which can accommodate two surround sensors.

FIG. 6 shows a perspective view of a possible embodiment of a fastening apparatus 3 according to the invention for a surround sensor 4 of a vehicle 1. In this case, the fastening apparatus 3 can be designed such that two surround sensors 4 can be arranged in a respective receptacle region 7 provided to this end. In this case, this can relate both to surround sensors 4 of the same type and to surround sensors 4 of different types. In other words, it is conceivable that for example a lidar sensor is arranged in the one receptacle region 7 and a camera is arranged in the other receptacle region 7. However, it is likewise also conceivable that for example two cameras or two lenses of a stereo camera are arrangeable in the receptacle region 7 of the sensor holding device 5 of the fastening apparatus 3. Such an embodiment is particularly advantageous whenever a plurality of cameras are used for different areas of application, for example on account of ever more comprehensive driver assistance systems.

What is claimed is:

1. A sensor installation system for a vehicle, comprising:
a fastening apparatus for a surround sensor of the vehicle, comprising:
   a sensor holding device that includes a receptacle region, wherein at least regions of the surround sensor are arrangeable within the receptacle region when the surround sensor is fastened to the sensor holding device, and
   a holding spring device configured to fasten and hold the surround sensor within the receptacle region via a spring force,
   wherein the holding spring device comprises a bearing element disposed at a first end of the holding spring device, wherein the bearing element rotatably mounts the holding spring device on the sensor holding device, and wherein the holding spring device is releasably fixable to the sensor holding device at a second end of the holding spring device opposite the first end; and
a surround sensor disposed in the receptacle region and fastened to the sensor holding device,
wherein the sensor holding device and the surround sensor have corresponding alignment elements that ensure the fastening of the surround sensor to the sensor holding device via a poka-yoke principle.

2. The sensor installation system of claim 1, wherein the sensor holding device has a pivot element and wherein at least regions of the pivot element are surrounded by the bearing element.

3. The sensor installation system of claim 1, wherein the holding spring device has a first latching element and the sensor holding device has a second latching element which form a latching connection for releasably fixing the holding spring device to the sensor holding device.

4. The sensor installation system of claim 3, wherein the first latching element and the second latching element are configured such that they only form the latching connection when the spring force exceeds a predetermined minimum force.

5. The sensor installation system of claim 3, wherein the sensor holding device and/or the holding spring device has an auxiliary element and wherein the latching connection is releasable by the auxiliary element.

6. The sensor installation system of claim 1, wherein the holding spring device is rotatably mounted in a minimum rotary range of between 70° and 200°.

7. The sensor installation system of claim 1, wherein together with the holding spring device of the fastening apparatus, the corresponding alignment elements restrict a movement of the surround sensor relative to the sensor holding device in three mutually perpendicular spatial directions.

8. The sensor installation system of claim 1, wherein the surround sensor is a camera.

* * * * *